United States Patent
Gilbert

(10) Patent No.: US 9,482,750 B2
(45) Date of Patent: Nov. 1, 2016

(54) VEHICLE COLLISION SHIELD

(71) Applicant: The Boeing Company, Chicago, IL (US)

(72) Inventor: Eric B. Gilbert, Seattle, WA (US)

(73) Assignee: The Boeing Company, Chicago, IL (US)

(*) Notice: Subject to any disclaimer, the term of this patent is extended or adjusted under 35 U.S.C. 154(b) by 173 days.

(21) Appl. No.: 14/311,637

(22) Filed: Jun. 23, 2014

(65) Prior Publication Data

US 2014/0300505 A1 Oct. 9, 2014

Related U.S. Application Data

(62) Division of application No. 10/945,373, filed on Sep. 20, 2004, now Pat. No. 8,862,379.

(51) Int. Cl.
| | |
|---|---|
| *G08G 1/16* | (2006.01) |
| *G01S 13/93* | (2006.01) |
| *G08G 5/00* | (2006.01) |
| *G01S 15/93* | (2006.01) |
| *B60T 7/22* | (2006.01) |

(52) U.S. Cl.
CPC .............. *G01S 13/931* (2013.01); *B60T 7/22* (2013.01); *G01S 15/93* (2013.01); *G08G 1/16* (2013.01); *G08G 1/165* (2013.01); *G08G 5/00* (2013.01); *G01S 2013/9346* (2013.01); *G01S 2013/9353* (2013.01); *G01S 2013/9382* (2013.01)

(58) Field of Classification Search
CPC ........... G01S 15/93; G08G 1/16; G08G 5/00
See application file for complete search history.

(56) References Cited

U.S. PATENT DOCUMENTS

| | | | | |
|---|---|---|---|---|
| 5,745,050 A * | 4/1998 | Nakagawa | ............... | G08G 1/16 180/167 |
| 6,442,484 B1 * | 8/2002 | Miller | ................. | B60R 21/0134 340/990 |
| 6,804,607 B1 * | 10/2004 | Wood | ...................... | G01S 3/784 180/167 |
| 6,888,953 B2 * | 5/2005 | Hanawa | ................ | G01S 13/931 348/E13.014 |
| 6,990,406 B2 * | 1/2006 | Fink | ..................... | G05D 1/0038 348/144 |
| 7,038,577 B2 * | 5/2006 | Pawlicki | ............. | G06K 9/4604 340/435 |
| 7,098,775 B2 * | 8/2006 | Perlo | ..................... | A01M 29/18 340/384.1 |
| 7,139,409 B2 * | 11/2006 | Paragios | ............ | G06K 9/00778 356/4.03 |
| 7,158,051 B2 * | 1/2007 | Strumolo | ............... | B60Q 9/008 180/167 |
| 7,225,063 B2 * | 5/2007 | Tart | ........................ | B64C 13/18 348/117 |
| 7,230,640 B2 * | 6/2007 | Regensburger | ....... | G01S 13/931 348/115 |
| 7,480,562 B2 * | 1/2009 | Kustosch | ........... | G01C 21/3697 180/14.4 |
| 2003/0197601 A1 * | 10/2003 | Takagi | ..................... | G08G 1/16 340/435 |
| 2005/0007244 A1 * | 1/2005 | Lang | ..................... | G01S 15/931 340/435 |
| 2005/0280518 A1 * | 12/2005 | Bartels | ................. | B60Q 1/2665 340/435 |
| 2006/0212222 A1 * | 9/2006 | Miyoshi | ............. | B60K 31/0008 701/301 |

* cited by examiner

*Primary Examiner* — Tuan C. To
(74) *Attorney, Agent, or Firm* — Miller, Matthias & Hull LLP

(57) ABSTRACT

A method for avoiding collisions with an aircraft ground-services vehicle includes using a proximity sensor attached to the ground-services vehicle to generate a proximity signal, and using a processor that stores a three-dimensional map of the ground-services vehicle's outer geometry. The three-dimensional map is modifiable upon in-use changes to the 3-D geometry of the ground-services vehicle. The processor uses the three-dimensional map and the proximity signal to determine whether a predetermined 3-D envelope around the vehicle has been breached, and notifies the vehicle of a breach.

10 Claims, 2 Drawing Sheets

VEHICLE COLLISION SHIELD

BACKGROUND

Flight-line vehicles including fuel trucks, ground power carts, baggage trains, cargo loaders, galley services vehicles, and mobile exit ramps pose a collision risk to commercial aircraft that are parked at a gate or other service location. Damage caused by a collision may be expensive to repair, and it can affect the dispatch of the aircraft at great cost to the airlines.

It is desirable to prevent flight-line vehicles from colliding with parked commercial aircraft.

SUMMARY

According to an embodiment herein, a method of avoiding collisions between a ground vehicle and a stationary aircraft comprises changing an outer geometry of the vehicle, sensing the proximity of the aircraft to the vehicle, and utilizing a digital map of three-dimensional outer dimensions of the ground vehicle. The map changes to describe the changes in the geometry of the vehicle. Utilizing the map includes comparing the dimension in the map to the proximity of the aircraft to determine when the aircraft is within a predetermined envelope around the outer dimensions of the ground vehicle. The method further includes activating a brake mechanism to automatically engage a ground vehicle brake when the aircraft is within the predetermined envelope.

According to another embodiment herein, a method for avoiding collisions with an aircraft ground-services vehicle includes using a proximity sensor attached to the ground-services vehicle to generate a proximity signal, and using a processor that stores a three-dimensional map of the ground-services vehicle outer geometry. The three-dimensional map is modifiable upon in-use changes to the 3-D geometry of the ground-services vehicle. The processor uses the three-dimensional map and the proximity signal to determine whether a predetermined 3-D envelope around the vehicle has been breached, and notifies the vehicle of a breach.

These features and functions may be achieved independently in various embodiments or may be combined in other embodiments. Further details of the embodiments can be seen with reference to the following description and drawings.

DETAILED DESCRIPTION

Figure 1:
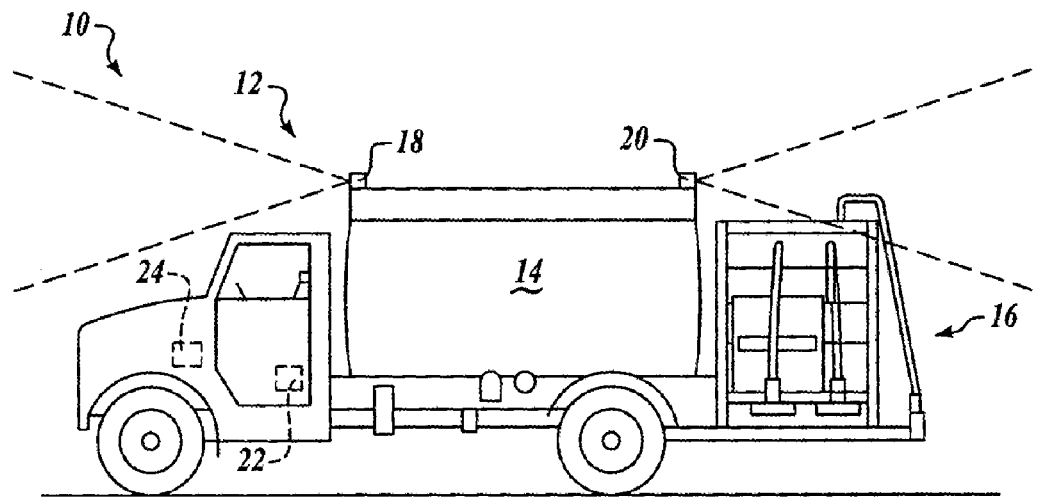
FIG. 1 is an illustration of a ground services vehicle equipped with a collision avoidance system.

Referring to FIG. 1, a ground services vehicle in the form of a fuel truck 10 includes a body 12 including a cab and engine compartment at the forward end of the vehicle. A tank 14 is held on the chassis of the truck 10 with an outer appliance 16 secured to the aft end of the truck 10. Such appliances may include pumps, hoses, or other apparatus to service aircraft. The fuel truck 10 is simply an illustrative example of a ground services vehicle. There are many examples of ground services vehicles that regularly approach very close to airplanes at aircraft terminals. These vehicles may have various sizes, shapes, and complexities. Such vehicles may include baggage trains, conveyer belt vehicles, galley supply vehicles, and other service vehicles.

In this embodiment, a micro radar device is secured to the fuel truck 10. Preferably, such a device includes a forward radar unit 18 and an aft radar unit 20. Such radar units 18 and 20 are directionally aimed to detect aircraft proximity in all directions of movement of fuel truck 10. Thus, the aft radar unit 20 is directed rearwardly for detection when fuel truck 10 is in a reverse direction relative to an aircraft. The forward radar unit 18 is for a forward direction of the vehicle. Both radar units 18 and 20 include a wide span of "vision" to account for turning of fuel truck 10 as it travels. Other proximity sensors may be used in alternate embodiments.

FIG. 1 also illustrates the general placement of a processor 22 that provides a comparator function to determine impending collision situations between fuel truck 10 and an aircraft. A brake actuator 24 is also illustrated. Once receiving a signal from the processor 22 of a near collision situation, the brake actuator 24 is activated to stop the fuel truck 10 prior to any such collision. In one embodiment, proximity sensors not only calculate distance from the aircraft, but also a velocity vector, calculating speed and direction. Such velocity vector information may be fed into the processor 22 such that the brakes are applied earlier or in graduated degrees depending on the speed of the vehicle. Directional data helps determine whether or not brake actuator 24 is engaged. The brake actuator 24 may apply brakes separately from the standard vehicle brakes or may simply be an actuator to apply the standard vehicle brakes to slow or stop the vehicle.

Figure 2:
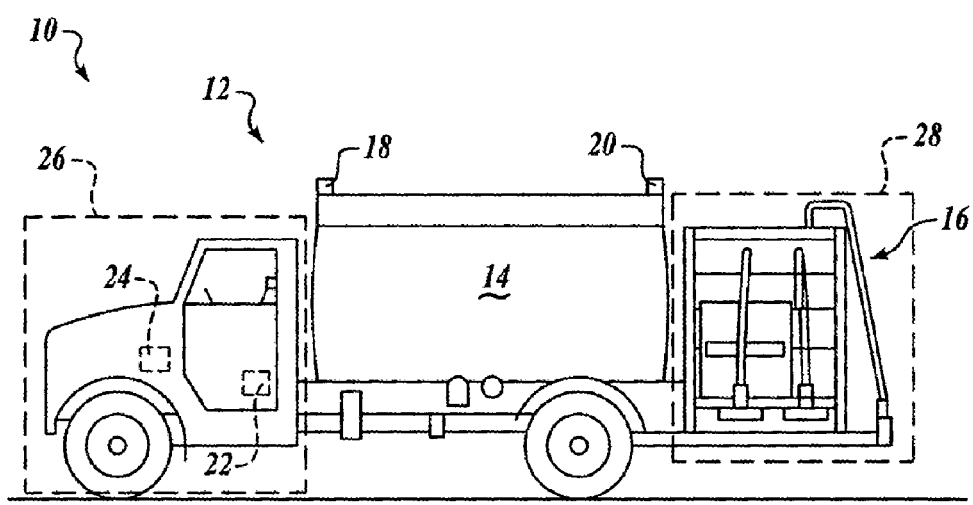
FIG. 2 is an illustration of a ground services vehicle showing various space envelopes.

Referring to FIG. 2, the processor 22 of the fuel truck 10 includes data specific to fuel truck 10 regarding the space envelope of the fuel truck 10. A 3-D map of the various portions of the fuel truck 10 may be fed into the processor 22 such that it may function as a comparator between the space envelopes and the data received from radar units 18 and 20. Thus, a vehicle forward space envelope 26 with the data from the three-dimensional configuration of body 12 may be stored in the processor 22. The three-dimensional space envelope 28 of the aft portion of fuel truck 10 is also stored in the processor 22. These are the portions of the vehicle that are most likely to collide with an aircraft. Alternatively, the entire vehicle space envelope may be stored in the processor 22.

With the 3-D configuration of fuel truck 10 stored in the processor 22, once proximity sensors, such as radar units 18 and 20, detect an aircraft part in close proximity to the space envelopes, the processor 22 signals the brake actuator 24 to slow or stop fuel truck 10. Thus, a collision may be avoided. It may be difficult for the driver of the fuel truck 10, or the driver of any other ground services vehicle to see the aircraft components or to see the various apparatuses, that may be appurtenant to such ground services vehicle. The sensors and comparators help the vehicle driver by sounding an alarm or activating a brake mechanism. The terminal areas of the airport may be quite noisy such than an audible alarm may be less effective than desired. The visual alarm may also be less effective than desired as it depends upon the vehicle operator viewing a certain direction. Furthermore, the slow speeds usually attendant to such areas of an aircraft terminal may allow for brakes to be automatically applied without excessive fear of operator injury.

Speed governors may also be employed within a terminal area of an aircraft to limit the overall speed of the ground services vehicle such that when the brakes are applied to avoid a collision, the speed reduction is not excessive.

Figure 3:
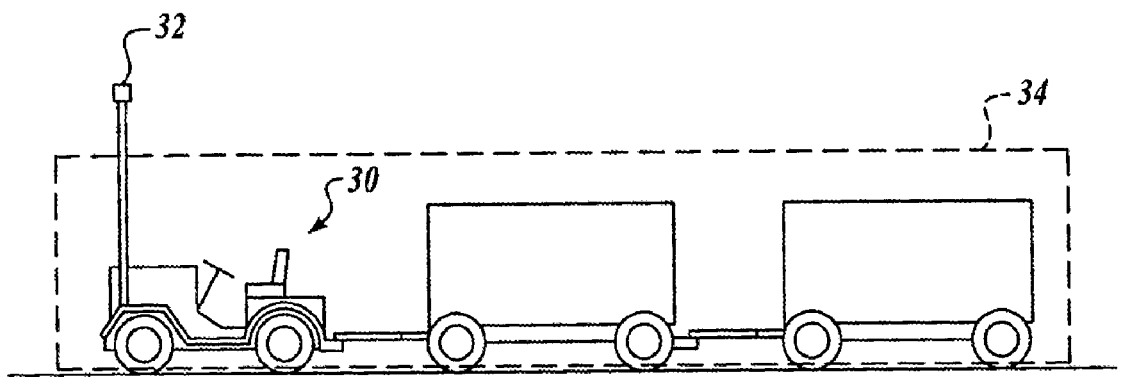
FIG. 3 is an illustration of a baggage train tug having a radar element on top of a small tower.

FIG. 3 illustrates a tug 30 with a baggage train. The tug 30 includes a radar tower 32 secured to the front thereof such that the radar can "see" the baggage train behind the tug 30 and other obstacles including aircraft. Alternatively, or additionally, the space envelope 34 of the tug 30 may be expanded automatically with the processor based on how many baggage cars are secured to the tug 30.

Figure 4:
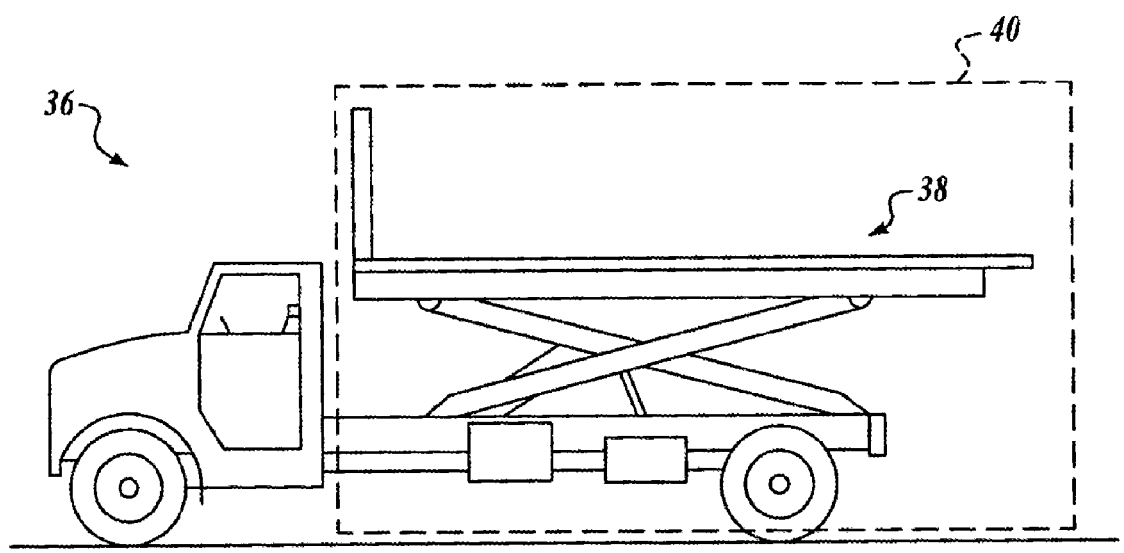
FIG. 4 is an illustration of a lift-bed truck illustrating an expanding space envelope.

In one embodiment, expansion of the space envelope is automatically employed or manually employed in the case of a vehicle that includes removable components such as that illustrated with a lift truck 36 of FIG. 4. The lift truck 36 includes a lift bed 38 that may be used for loading supplies onto aircraft. The processor preferably includes three-dimensional configuration data of lift truck 36. Such data includes provision for expanding the space envelope as the scissors lift on a lift bed 38 is extended. Thus, an expandable envelope 40 is programmed into the processor. Sensors are preferably applied to the lift mechanism or to the bed to indicate to the processor the extension of the bed.

In some embodiments, GPS units may be used on the ground services vehicle with GPS unit on the aircraft. Both the ground services vehicle and the aircraft can signal to a comparator either at the terminal or on the ground services vehicle, which can then activate the brake mechanism. The aircraft three-dimensional map may also be programmed into the processor or comparator for each specific aircraft to which the ground services vehicle is assigned. With the GPS signals and the three-dimensional maps, the comparator can determine the proper space envelopes and when such envelopes may be potentially breached. With the GPS or other location signal aboard the ground services vehicle, a territory switch may also be applied to reduce the likelihood of false actuation of the brake mechanism. The territory switch would allow the brake mechanism to be activated only, for example, in the terminal area of the airport. Furthermore, an airport-wide anti-collision system could be employed with GPS units on aircraft and ground services vehicles sending signals to a processor which then compares the space envelopes and velocity vectors.

The invention claimed is:

1. A method of avoiding collisions between a ground vehicle and a stationary aircraft, the vehicle including movable elements that change an outer geometry of the vehicle, the method comprising:
   changing the outer geometry of the vehicle;
   sensing the proximity of the aircraft to the vehicle;
   utilizing a digital map of three-dimensional outer dimensions of the ground vehicle, the digital map being modifiable to describe changes in the outer geometry of the vehicle, wherein utilizing the map includes comparing the map of three-dimensional outer dimensions of the ground vehicle to the proximity of the aircraft to determine when the aircraft is within a predetermined envelope around the outer dimensions of the ground vehicle; and
   activating a brake mechanism to automatically engage a ground vehicle brake when the aircraft is within the predetermined envelope.

2. The method of claim 1, further comprising sensing the vehicle proximity to an airport gate area, wherein the brake mechanism is activated within a predetermined proximity to the gate area.

3. The method of claim 2, wherein sensing the vehicle proximity to the gate area includes receiving a global positioning system signal of vehicle location.

4. The method of claim 1, further comprising detecting a direction vector and velocity of the ground vehicle; wherein activation of the brake mechanism is modified based on the detected velocity.

5. The method of claim 1 wherein the proximity is sensed with a first global positioning system attached to said ground services vehicle; wherein a second global positioning system is aboard the aircraft, and wherein signals from the first and second global positioning systems are compared to determine when the aircraft is within the predetermined envelope.

6. A method for avoiding collisions with an aircraft ground-services vehicle, the method comprising:
   using a proximity sensor attached to the ground-services vehicle to generate a proximity signal; and
   using a processor that stores a three-dimensional map of the ground-services vehicle outer geometry, the three-dimensional map modifiable upon in-use changes to the 3-D geometry of the ground-services vehicle;
   wherein the processor uses the three-dimensional map and the proximity signal to determine whether a predetermined 3-D envelope around the vehicle has been breached, and notifies the vehicle of a breach.

7. The method of claim 6, further comprising engaging brakes on the ground-services vehicle when the envelope is breached.

8. The method of claim 7, wherein the brakes are engaged when the ground-services vehicle is in a pre-designated aircraft terminal gate area.

9. The method of claim 6, wherein the proximity sensor includes a global positioning system aboard the ground-services vehicle; wherein a global positioning system is aboard an aircraft; and wherein the processor uses signals from both global positioning systems to determine distance between the ground-services vehicle and the aircraft.

10. The method of claim 6, wherein the processor receives signals of vehicle geometry changes in use, and modifies the three-dimensional map upon receiving the geometry changes.

* * * * *